United States Patent
Ahmed et al.

(10) Patent No.: US 10,564,330 B2
(45) Date of Patent: Feb. 18, 2020

(54) METASURFACE DEVICES FOR DISPLAY AND PHOTONICS DEVICES

(71) Applicant: INTEL CORPORATION, Santa Clara, CA (US)

(72) Inventors: Khaled Ahmed, Anaheim, CA (US); John Heck, Berkeley, CA (US); Ramon Cancel Olmo, Hillsboro, OR (US); Richmond Hicks, Aloha, OR (US); Olga Gorbounova, Fremont, CA (US)

(73) Assignee: INTEL CORPORATION, Santa Clara, CA (US)

( * ) Notice: Subject to any disclaimer, the term of this patent is extended or adjusted under 35 U.S.C. 154(b) by 0 days.

(21) Appl. No.: 16/229,751

(22) Filed: Dec. 21, 2018

(65) Prior Publication Data
US 2019/0121004 A1  Apr. 25, 2019

(51) Int. Cl.
*G02B 5/02* (2006.01)
*G02B 6/42* (2006.01)

(52) U.S. Cl.
CPC ........... *G02B 5/021* (2013.01); *G02B 6/4206* (2013.01); *G02B 6/4214* (2013.01)

(58) Field of Classification Search
None
See application file for complete search history.

(56) References Cited

U.S. PATENT DOCUMENTS

2019/0064532 A1*  2/2019  Riley, Jr. ............ G02B 27/0916

* cited by examiner

*Primary Examiner* — Jerry Rahll

(57) ABSTRACT

Disclosed herein are display and photonic devices utilizing metasurfaces. An optical device comprising an optical component and an optical transmission medium is disclosed. A waveguide couples the optical component and the optical transmission medium. A metasurface is disposed on an end of the waveguide and arranged to increase an optical coupling between the waveguide and the optical transmission medium. Additionally, a display comprising a number of light emitting elements and a metasurface for each of the light emitting elements. The metasurface arranged to eliminate screen door effect in virtual reality display systems.

23 Claims, 9 Drawing Sheets

_800_

Receive light at a metasurface comprising a number of meta-atoms arranged in a geometric array.
_810_

Manipulate the light to provide an optical function corresponding to an optical device in which the metasurface is disposed.
_820_

METASURFACE DEVICES FOR DISPLAY AND PHOTONICS DEVICES

TECHNICAL FIELD

Embodiments herein generally relate to surfaces and structures formed upon surfaces to guide light.

BACKGROUND

Many modern technological systems and/or methods implement some form of photonics. For example, many modern technological systems and/or methods implement some form of light (e.g., photon) generation, light detection, and/or light manipulation. Silicon photonic applications rely heavily on waveguides to guide light. However, forming lenses, prisms, or other structures from waveguides can be problematic.

One application of photonics is in head mounted displays, virtual reality display, or augmented reality displays. However, conventional displays implemented as head mounted, virtual, or augmented displays typically have a much narrower field of view than the user. However, as displays are magnified to cover larger fields of view, what is referred to as the "screen door effect" becomes more prevalent. The screen door effect refers to dark spaces between pixels that become noticeable to a user as the perceived image is magnified.

Another application of photonics is stereo and structured light projectors. Such projectors typically rely on a combination of lasers and refractive or diffractive optics. However, these optics add bulk as well as additional components to the projectors, increasing their complexity and cost. Another application of photonics is to filter some portion of light. However, conventional filtering techniques require additional lenses, prisms, or waveguides to filter light, thereby increasing bulk and cost of the devices.

DETAILED DESCRIPTION

Figure 1A:
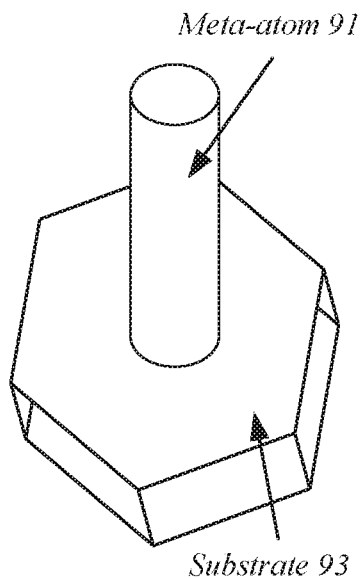
FIGS. 1A-1C illustrate examples of a nano-structure and metasurface.

Various embodiments may be generally directed to forming nanostructures on a surface to manipulate light incident upon the surface. Such nanostructures and surfaces may be referred to as "metasurfaces" or "photonic metasurfaces" (PMs). These metasurfaces can be arranged as lenses, prisms, or the like. Furthermore, multiple PMs can be combined to form optical multiplexers and/or optical demultiplexers.

Some embodiments provide metasurfaces combined and/or integrated onto surfaces where filtering of light might be desired. For example, nanoparticles can be formed directly on solar cells and arranged to block unwanted light (e.g., infrared or the like) from the light spectrum to increase the efficiency of the solar cells. As another example, nanoparticles can be formed directly on transparent surfaces (e.g., windows, eye-glass lenses, or the like) and arranged to block unwanted light (e.g., infrared light, ultra-violet (UV) light, or the like). Such filtering can be implemented to increase energy efficiency of the windows themselves, energy efficiency of the structure in which the windows are installed, or block unwanted light components (e.g., UV rays) from being transmitted through the transparent surface.

In some embodiments, metasurfaces can be combined with and/or integrated onto LEDs (e.g., OLEDs, µLEDs, or the like) and arranged to diffuse light emitted from the LEDs. For example, a display comprising a combination of red, green, and blue LEDs combined with metasurfaces can be arranged to diffuse light corresponding to sub-pixels in a projected image to reduce the screen door effect.

Some embodiments can provide metasurfaces implemented in a head-mounted or head worn display (HWD). The present disclosure provides HWDs comprising flat mirrors implemented by metasurface materials and/or diffractive optical technology. For example, a HWD can be implemented with an image generation device (e.g., a light emitting diode (LED) display, an organic light emitting diode (OLED) display, a micro (µ) LED display, or the like) and a metasurface mirror to reflect and enlarge images, generated by the image generation device, to be viewed in an enlarged scale by a user of the HWD.

With some embodiments, HWDs can be provided with metasurfaces arranged to redirect light (e.g., from a projector) within the HWD. For example, the present disclosure can provide HWDs comprising metasurface materials arranged to replace conventional prisms within the HWD.

In some embodiments, metasurfaces can be combined and/or integrated with a laser, such as, a vertical cavity surface emitting laser (VCSEL) or an array of lasers (e.g., an array of VCSELs) and arranged to re-image the light emitted from the laser or laser array into a specific pattern. Such metasurfaces and lasers can be implemented to form a structured light projector.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, known structures and devices are shown in block diagram form to facilitate a description thereof. The intention is to provide a thorough description such that all modifications, equivalents, and alternatives within the scope of the claims are sufficiently described.

Additionally, reference may be made to variables, such as, "a", "b", "c", which are used to denote components where more than one component may be implemented. It is important to note, that there need not necessarily be multiple components and further, where multiple components are implemented, they need not be identical. Instead, use of variables to reference components in the figures is done for convenience and clarity of presentation.

Metasurfaces for Light Manipulation in Silicon Photonic Transceivers

Figure 1C:
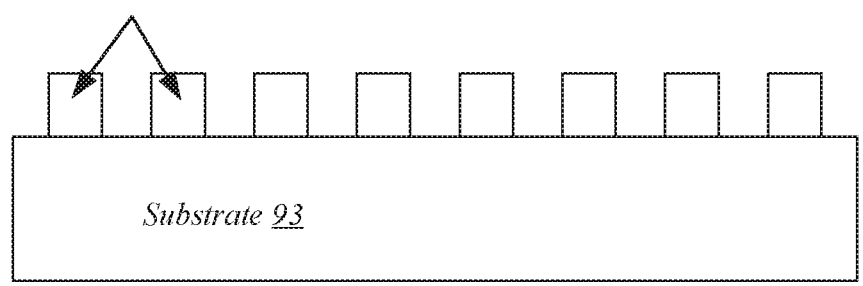
Figure 1B:
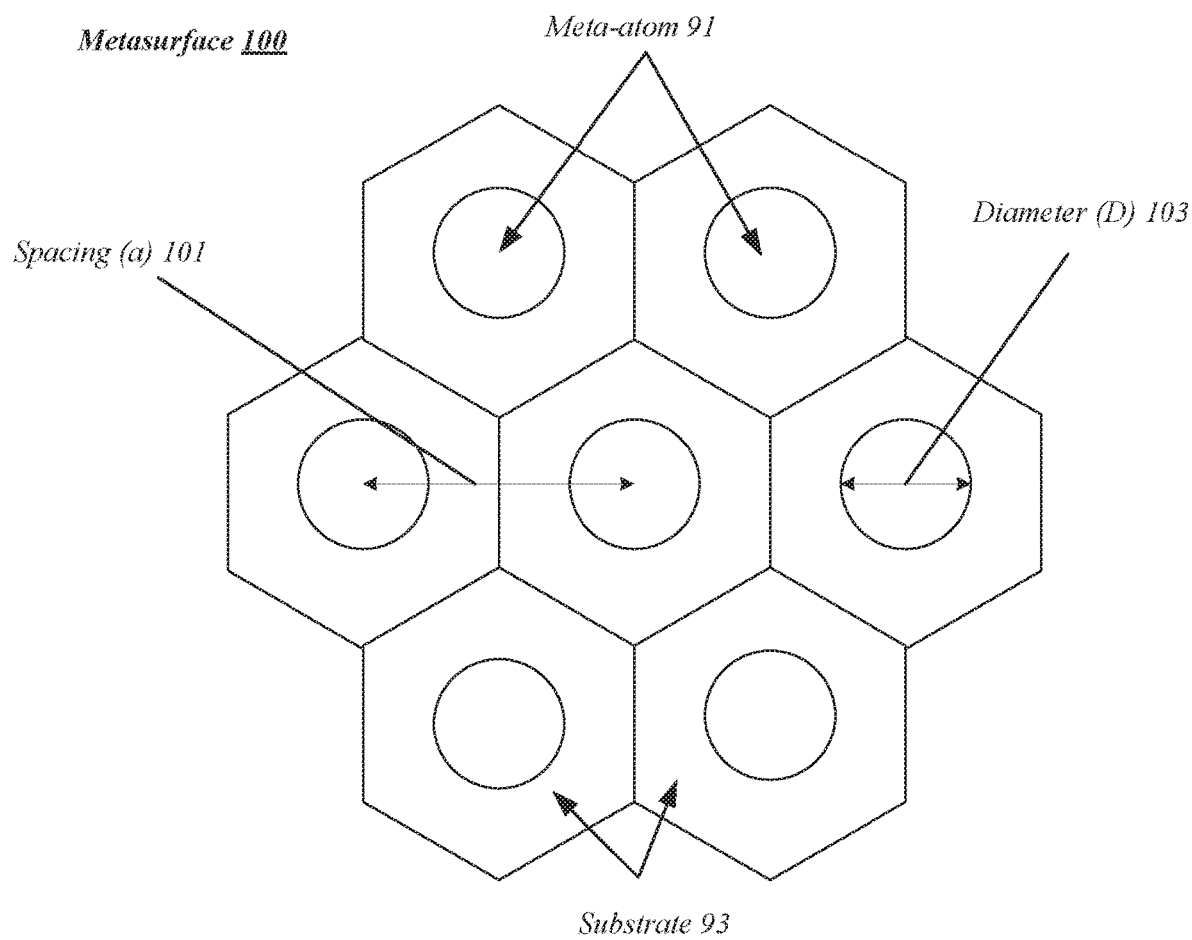

FIGS. 1A-1C illustrate an example nanostructure and metasurface according to some examples of the present disclosure. In general, metasurfaces can be constructed from arrays (FIGS. 1B-1C) of nanostructures (FIG. 1A) arranged to manipulate incident light, for example, by manipulating the wavefront, polarization, intensity, or the like of the incident light.

FIG. 1A depicts an example nanostructure 90 comprising a meta-atom 91 and a substrate 93. In some example, the meta-atom 91 can be formed upon the substrate 93. Multiple nanostructures 90 can be combined (e.g., coupled, formed on the same substrate, or the like) into various array to form a metasurface 100. An example metasurface 100 is depicted in FIGS. 1B-1C. With some examples, a metasurface, such as metasurface 100, operates more optimally at one wavelength, or one range of wavelengths, than other wavelengths. With some examples, the arrangement of the nano-structures 90 of the metasurface contributes to the optimal conditions under which the metasurface 100 operates.

In some examples, meta-atom 91 can be cylindrical, for example a cylindrical post as depicted. In other examples, meta-atom 91 can be rectangular, square, pyramid shaped, dome shaped, or another arbitrary shape. The shape of meta-atom 91 can be arranged, designed, formed, or the like to provide a desired manipulative effect on incident light. For example, some implementations can comprise rectangular dielectric cuboid meta-atoms, which induce birefringence and have an optical response that may be sensitive to the polarization of the incident radiation. As another example, some implementations can comprise pillars or cylinders, which can be configured to operate on unpolarized light, particularly when centrosymmetric subwavelength features of the radiation are involved. Meta-atom 91 can be formed on substrate 93, which can be a transparent substrate, a reflective substrate, an opaque substrate or a substrate having other light or photonic properties. In some examples, substrate 93 can be a dielectric material.

Turning to FIGS. 1B and 1C, a top view (FIG. 1B) and a cross sectional view (FIG. 1C) of the metasurface 100 are depicted. As noted, metasurface 100 can be formed from multiple nano-structures 90. For example, metasurface 100 can be formed from nano-structures 90, disposed in a geometric arrangement, such as a lattice arrangement. Metasurface 100 could be configured to provide high transmission and subwavelength spatial control of both polarization and phase light. To that end, meta-atoms 91 can be spaced a distance 101 to provide a desired optical response from the metasurface 100. It is important to note that nanostructures can be arranged in any of a variety of geometric or pseudo-random patterns, not limited to the pattern depicted in FIG. 1B.

In general, the geometric properties of the metasurface 100, such as, for example, spacing 101 between meta-atoms 91 and geometric properties (e.g., diameter 103) of meta-atom 91 can be selected to provide a desired optical response from the metasurface 100. For example, the amplitude and phase of light transmitted from metasurface 100 can depend on the ratio D/$\lambda$, where D is the diameter 103 and $\lambda$, is the wavelength of incident light. In some examples, the maximum value of spacing 101 is the lattice constant above which higher diffraction orders will be propagating in the substrate 93 and is given by $2\lambda/\sqrt{3}n_g$, where $n_g$ is the refractive index of the substrate 93 (e.g. $n_g=1.452$ for silica substrate).

In general, a metasurface (e.g., metasurface 100) operates as follows: Radiation (or light) is incident on the metasurface 100, and particularly the meta-atoms 91 of the metasurface 100. Electric and magnetic responses, typically of comparable strengths, is manifest due to the meta-atoms 91.

For example, the incident radiation is coupled to the electric field's circular displacement current, which results in a strong magnetic dipole resonance. The magnetic resonance occurs when the wavelength inside the particle becomes comparable to its spatial dimension. That is, when $D \approx \lambda/n$, where n is the refractive index of the material of the meta-atom 91.

Figure 2:
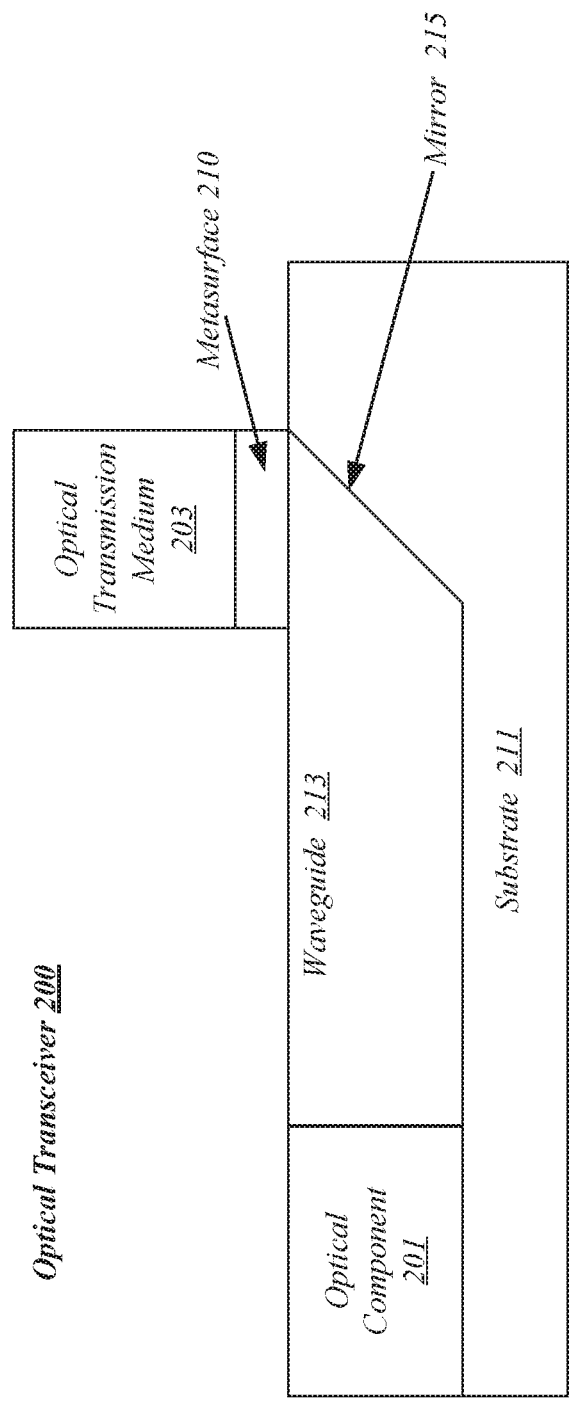
FIG. 2 illustrates an example optical transceiver.

FIG. 2 depicts a block diagram of an optical transceiver 200. Optical transceiver 200 can include an optical component 201 and an optical coupler 210 arranged to couple the optical component 201 to an optical transmission medium 203, such as, an optical fiber. Optical coupler 210 can include a substrate 211 on which a waveguide 213, reflective surface 215, and metasurface 217 are formed. The optical component 201 can be coupled to one end of waveguide 213 while the optical transmission medium 203 can be coupled to the metasurface 217. Waveguide 213 and reflective surface 215 can be arranged to transmit light beams from an entrance pupil of the waveguide to an exit pupil of the waveguide. Said differently, waveguide 213 and reflective surface 215 can be arranged to guide light between the optical component 201 and the optical transmission medium 203.

With some examples, metasurface 217 can be patterned onto waveguide 213 and configured (e.g., nano-structures 91 of metasurface 217 arranged, or the like) as a collimating lens. Such a function can be beneficial for minimizing optical loss between waveguide 213 and the optical transmission medium 203. For example, metasurface 203 can be implemented to relax alignment tolerances between waveguide 213 and the optical transmission medium 203. More specifically, in conventional optical transceivers, the bulk optical assembly must be actively aligned in all 6 axes. However, with optical transceiver 200, metasurface 217 may be configured to output a collimated output beam. As such, alignment between waveguide 213 and optical the optical transmission medium 203 may be simplified. Thus, yield and manufacturing throughput can be increased while assembly cost can be reduced. Furthermore, due to the flat nature of metasurface 217, the interface between the waveguide 213 and the optical transmission medium 203 may be more robust than conventional interfaces.

With some examples, optical component 201 can be arranged to emit light or detect light. For example, optical component 201 could include a laser, an LED, a photodiode, or the like. It is noted, that the optical transceiver 200 of FIG. 2 has many advantages over conventional optical transceivers. For example, since the photonic waveguides are typically in the range of 0.5 µm-5 µm, light diverges rapidly once emitted from the waveguide. Adding a lens this small to the waveguide is not practical, so divergent light must be collected by either butt-coupling the optical component directly to the output facet, or by placing a large lens far away from the facet and collecting the diverged light at that point. The metasurface 217 in optical transceiver 200 solves this problem.

Figure 3:
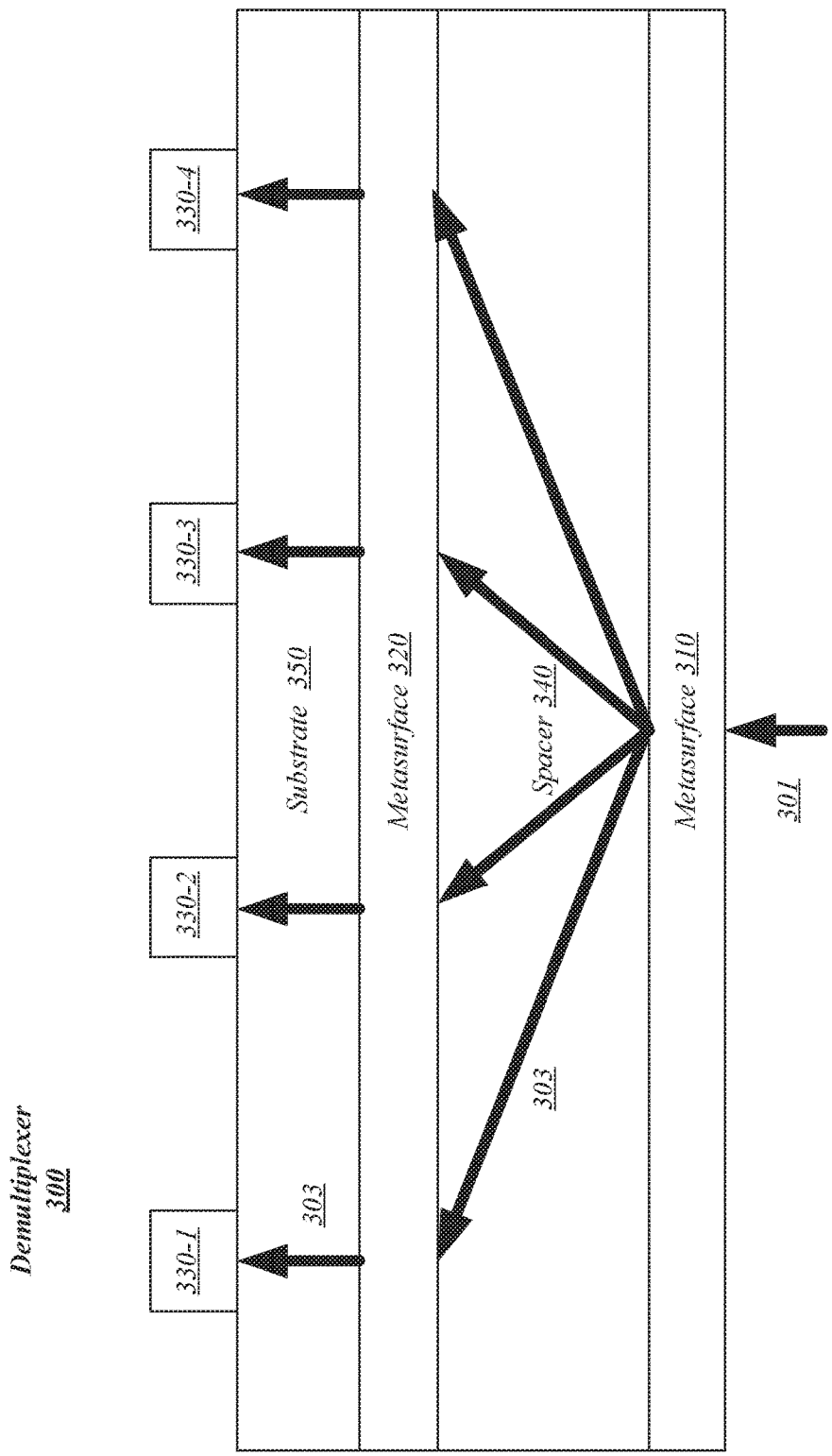
FIG. 3 illustrates an example demultiplexer.

FIG. 3 depicts a block diagram of a demultiplexer 300. Demultiplexer 300 comprises a first metasurface 310, a second metasurface 320 and photodetectors 330. In general, the first metasurface 310 is arranged to receive incident light 301 and split the incident light 301 into light beams 303 of constituent wavelengths while the second metasurface 320 is arranged to focus the light beams 303 and direct them towards the photodetectors 330. Demultiplexer 300 can also comprises a spacer 340 separating the first metasurface 310 and the second metasurface 320. Photodetectors 330 can be formed or disposed on substrate 350.

In general, metasurfaces rely on subwavelength structures to shape the optical wavefront (e.g., incident light 201, light beams 203, or the like). As such, they are highly wavelength dependent. Thus, metasurfaces can be used to fabricate prisms to split light based on wavelength. A challenge with conventional silicon photonics is that silicon-based demultiplexers are highly temperature sensitive, so discrete silica demultiplexers, which are expensive, are often used in real-world applications.

Demultiplexer 300 can be implemented with metasurfaces that rely on chromatic dispersion of the photonic metasurface to split (e.g., via metasurface 310) incident light 301 into lights beams 303 based on constituent wavelengths (e.g., 4 light beams of constituent wavelengths, 8 light beams of constituent wavelengths, etc.). These light beams 303 can then be directed (e.g., via metasurface 320) into separate photodetectors. For example, this figure depicts metasurface 310 splitting incident light 301 into four (4) separate light beams 303 and metasurface 320 directing these light beams 303 to respective photodetectors 330-1, 330-2, 330-3, and 330-4.

With some examples, metasurface 310 and 320 can use a transparent material to maximize the efficiency (e.g., minimize optical loss). For example, metasurfaces 310 and 320 can be formed from silicon. In such an example, demultiplexer 300 can have >90% optical efficiency.

In some embodiments, the transmission angle from the first metasurface 310 can be given by:

$$\theta_t = \sin^{-1}\left(\frac{\lambda}{2\pi}\frac{\partial \Phi}{\partial x}\right)$$

where $\partial\Phi/\partial x$ is the gradient of the phase along the plane of the metasurface 310 and $\lambda$ is the wavelength of incident light 301. The metasurface 310 can be arranged such that the gradient achieves the desired transmission angle. The second metasurface 320 can be arranged to steer the light beams 303 into photodetectors 330-1 to 330-4, respectively. Each of photodetector 330-1 to 330-4 can be tuned to detect a specific wavelength of light. It is important to note; a multiplexor could be implemented using the same principles and components as described above for the demultiplexer 300. For example, light from separate outputs can be directed toward a photonic metasurface, which combines them into a single beam.

The present disclosure and example optical devices with metasurfaces can provide an advantage over conventional optical devices. For example, expensive discrete optical components can be replaced by metasurfaces as detailed herein. Thus, the example optical devices of the present disclosure can simplify optical alignment, thereby reducing manufacturing cost. Furthermore, the present disclosure can provide optical devices having independent control of the shape and optical function enabling improved mechanical and optical interfaces.

Virtual Reality Display System to Mitigate Screen Door Effect

Figure 4A:
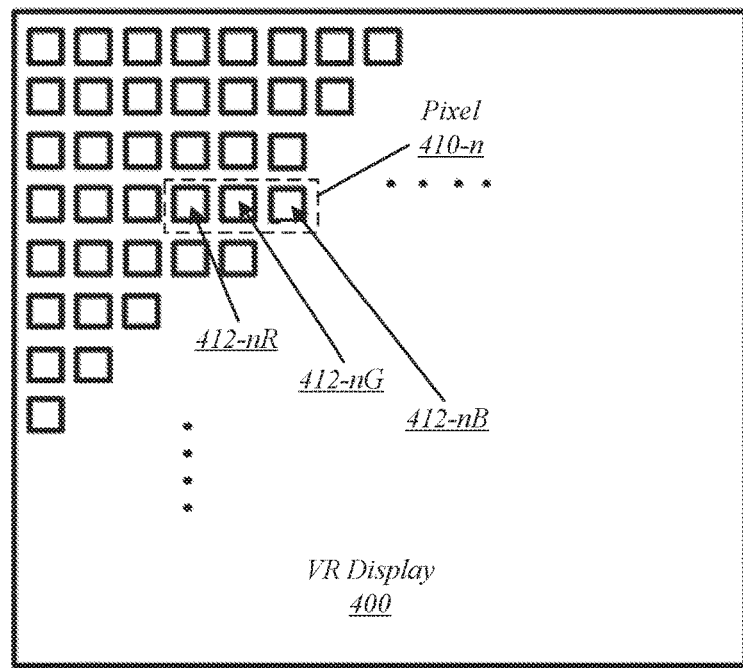
FIGS. 4A-4B illustrate an example display for a virtual reality system.
Figure 4B:
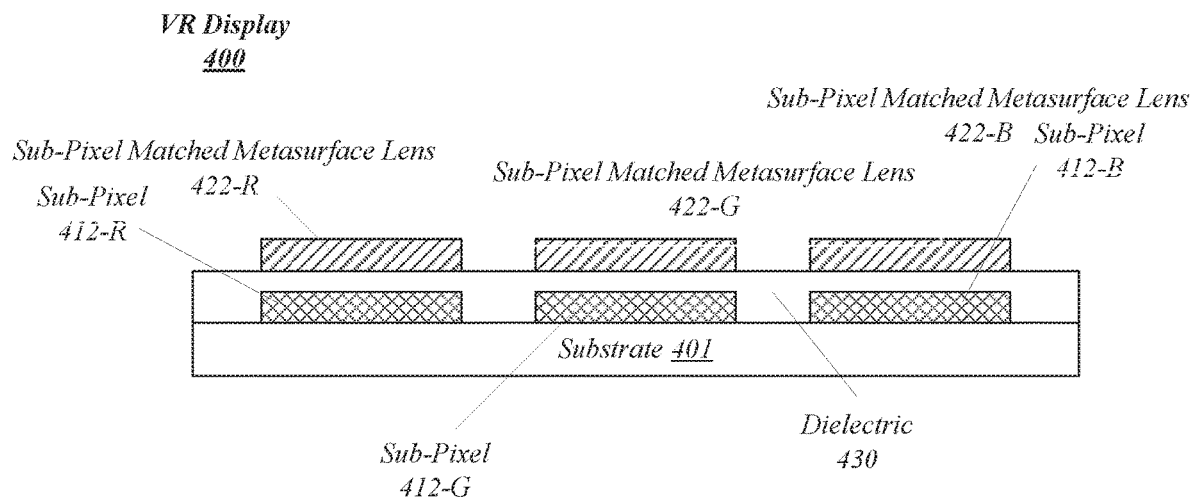

It is to be appreciated, to provide an immersive VR experience, images presented on a display may be magnified to cover a large field of view, for example, between 90 and 120 degrees. As such, the pixels from the presented images are also magnified. However, conventional display technologies have portions of the pixel that are inactive or dark. For example, FIGS. 4A-4B depict an example implementation of the VR display 400. In general, VR display 400 can be based on any of a variety of display technologies, such as, for example, LCD, OLED, or the like.

FIG. 4A depicts a front view VR display 400 while FIG. 4B depicts a cross sectional view of the VR display 400. Turning more specifically to FIG. 4A, VR display 400 comprises a plurality of subpixels 412 arranged in a grid or array. Pixels 410 are formed from groups of the subpixels 412. For example, in some implementations, a red, green, and blue subpixel 412 (see FIG. 4B) can be provided for each pixel 410. As a specific example, pixel 410-n is depicted including sub-pixels 412-nR, 412-nG, and 412-nB. During operation, sub-pixels 412 can be selectively illuminated to display images on VR display 400.

Turning more specifically to FIG. 4B, the cross sectional block diagram of a portion of the VR display 400 is depicted. Specifically, this figure depicts a portion of VR display 400 corresponding to a single pixel 410 and sub-pixels 412 from the pixel 410. For example, sub-pixels 412-R, 412-B and 412-G are depicted. In general, VR display 400 can be formed on a substrate 401, such as for example, silicon. Sub-pixels 412-R, 412-B and 412-G are disposed on the substrate 401. With some examples, sub-pixels 412-R, 412-B and 412-G can be LEDs. A dielectric 430 is disposed on the subpixels 412-R, 412-G and 412-B and metasurface lenses 422 are disposed on the dielectric 430. In some examples, the dielectric 430 is transparent and configured to "space" metasurface lenses 422 a determined distance away from the sub-pixels 412.

In general, each metasurface lens 422 receives light from one subpixel and directs the resulting ray to an eye of the wearer or user of the VR system 800. For example, lens 422-R receives light from sub-pixels 412-R, lens 422-G receives light from sub-pixels 412-G, and lens 422-B receives light from sub-pixels 412-B. Accordingly, a coherent image can be formed on the user's retina and perceived by the user. Metasurface lenses 422 can be configured to have an optical function to steer the light from the sub-pixel emitters into the eye at a desired angle, which can depend on the position on the display. Note that while the metasurface lenses 422 and sub-pixels 412 are drawn as the same size in this illustration, in some embodiments the sizes and shapes may be different. As an example, the sub-pixel 412 may be much smaller than the metasurface lenses 422.

In some examples, the meta-atoms (e.g., meta-atoms 91) of metasurface lenses 422 can be formed from titanium oxide and can be fabricated and integrated with the underlying display panel as depicted in FIG. 4B. In some examples, the display itself can be on the order of a few millimeters thick. As such, the VR display 400 can approach the thickness of an ordinary pair of eyeglasses.

Figure 5:
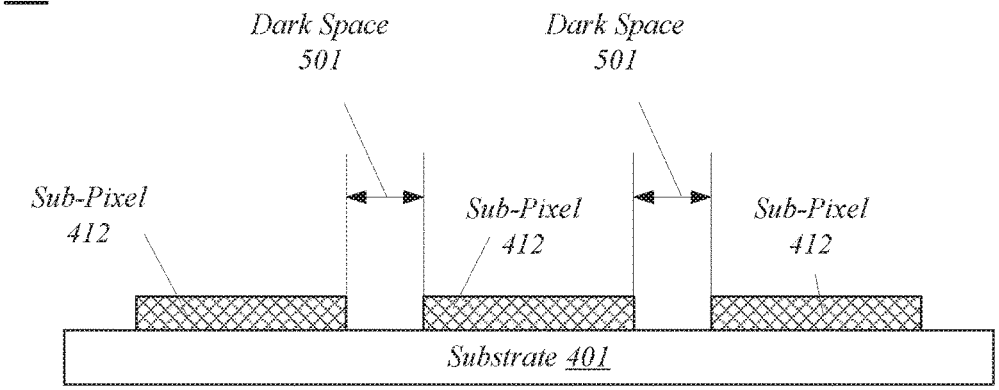
FIG. 5 illustrates an example sub-pixel display.

FIG. 5 depicts a portion of a sub-pixel display comprising sub-pixels 412 formed on substrate 401. Dark space 501 between sub-pixels 412 is highlighted. Due to the dark space 501, within each pixel 410 and/or between each pixel 410 will be a dark or non-emissive area. During normal viewing applications, these dark regions are too small to be perceived by human viewers. However, because of the magnification process from VR optics, the dark space between subpixels become large enough to be noticeable, and in many cases, objectionable. This phenomenon is typically referred to as a screen door effect as the scene appears as if viewed through a screen.

Figure 6:
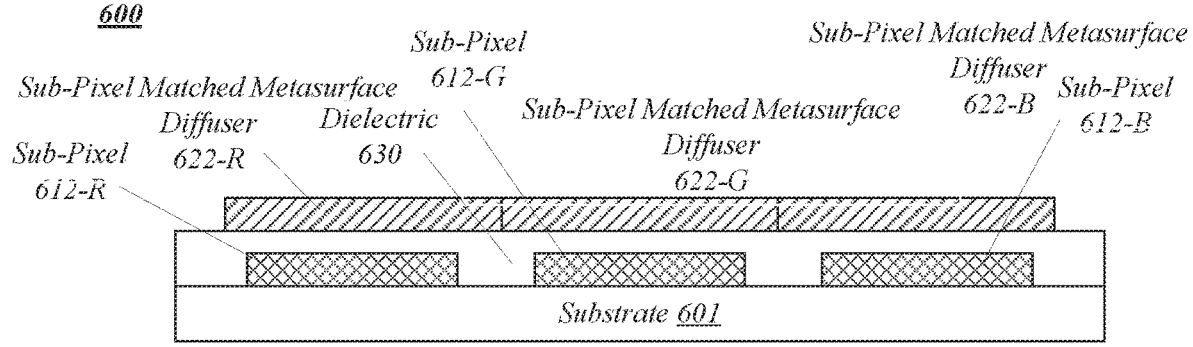
FIG. 6 illustrates another example display for a virtual reality system.

The present disclosure provides a display arranged to mitigate at least some portions of the screen door effect manifest in conventional displays. FIG. 6 depicts a cross sectional block diagram of a VR display 600 arranged according to some examples of the present disclosure. VR display 600 comprises sub-pixels 612-R, 612-B and 612-G (e.g., for red, greed, and blue sub-pixels), which can correspond to a single pixel 610. Subpixels 612-R, 612-B and 612-G are disposed on a substrate 601, such as, for example, silicon. A dielectric 630 is disposed on the subpixels 612-R, 612-G and 612-B and metasurface diffusers 622 are disposed on the dielectric 630. In some examples, the dielectric 630 is transparent and configured to "space" metasurface diffusers 622 a determined distance away from the sub-pixels 612.

In general, each metasurface diffuser 622 is configured to diffuse light from a corresponding sub-pixel 612 to reduce, blur, or eliminate the perceived dark space between subpixels 612. Metasurface diffusers 622 can also, like metasurface lenses 422 magnify and/or steer the light emitted from sub-pixels 612 (e.g., as described above with respect to VR display 400).

Figure 7:
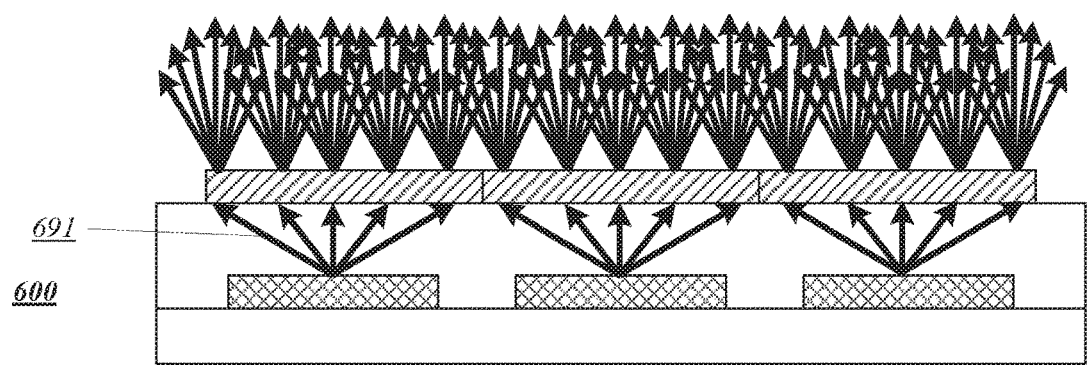
FIG. 7 illustrates the example display of FIG. 6 dispersing light emitted from the display.

FIG. 7 depicts the example VR display 600 from FIG. 6 during operation. It is noted that the VR display 600 of FIG. 7 includes all the same components of the VR display 600 of FIG. 6, however, these components are not specifically called out for purposes of clarity and to provide space to how light emitted by the VR display 600. During operation, sub-pixel light emitting elements (e.g., LEDs, OLEDs, etc.) cam emit light rays 691. Metasurface diffusers 622 generate diffused light 693 from light 691, which results in blurring and/or elimination of the dark space (e.g., dark space 1001) between sub-pixels 612. It is noted, that the metasurface diffusers 622 can have an optical function arranged to diffuse light from a specific color (e.g., wavelength, or the like). In some examples, the metasurface diffusers 622 can have meta-atoms (e.g., meta-atoms 91) having specific dimensions to determine the peak wavelength of the transmitted light. Example sizes are Diameter $\lambda/10$ to $\lambda/4$, with height $h \approx \lambda/2$ and pitch $P = \lambda/2$.

Figure 8:
FIG. 8 illustrates an example logic flow.

FIG. 8 depict a logic flow 800 for manipulating light using a metasurface device per at least one example of the present disclosure. Logic flow 800 may begin at block 810. At block 810 "receive light at a metasurface comprising several meta-atoms arranged in a geometric array" a metasurface can receive light. For example, metasurfaces 210, 310, 320, 410, 630, 922, 1122, 1314, 1416, or 1530 can receive light.

Continuing to block 820 "manipulate the light to provide an optical function corresponding to an optical device in which the metasurface is disposed" the metasurface can manipulate the received light. For example, metasurface 210 can manipulate incident light to increase a coupling between waveguide 203 and optical component 220.

Figure 9:
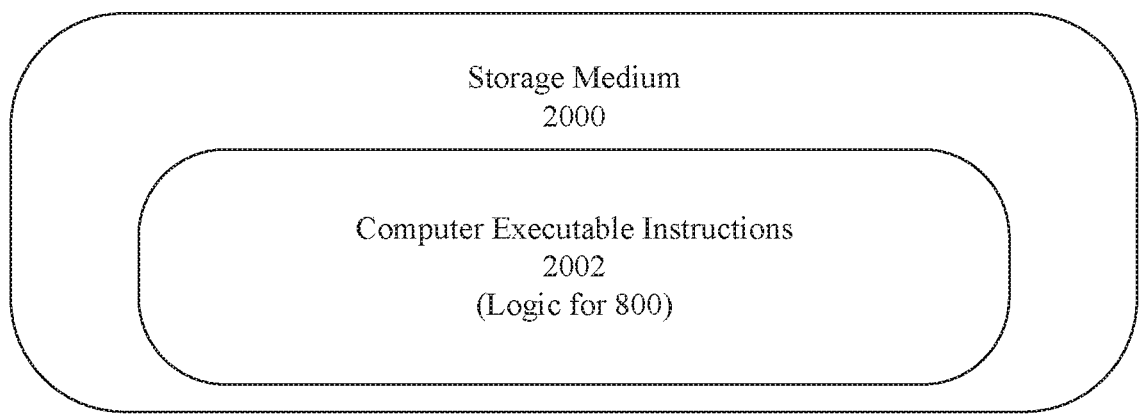
FIG. 9 illustrates an example computer-readable medium.

FIG. 9 illustrates an embodiment of a storage medium 2000. The storage medium 2000 may comprise an article of manufacture. In some examples, the storage medium 2000 may include any non-transitory computer readable medium or machine readable medium, such as an optical, magnetic or semiconductor storage. The storage medium 2000 may store various types of computer executable instructions e.g., 2002). For example, the storage medium 2000 may store various types of computer executable instructions to implement technique 800.

Examples of a computer readable or machine readable storage medium may include any tangible media capable of storing electronic data, including volatile memory or non-volatile memory, removable or non-removable memory, erasable or non-erasable memory, writeable or re-writeable memory, and so forth. Examples of computer executable instructions may include any suitable type of code, such as source code, compiled code, interpreted code, executable code, static code, dynamic code, object-oriented code, visual code, and the like. The examples are not limited in this context.

Figure 10:
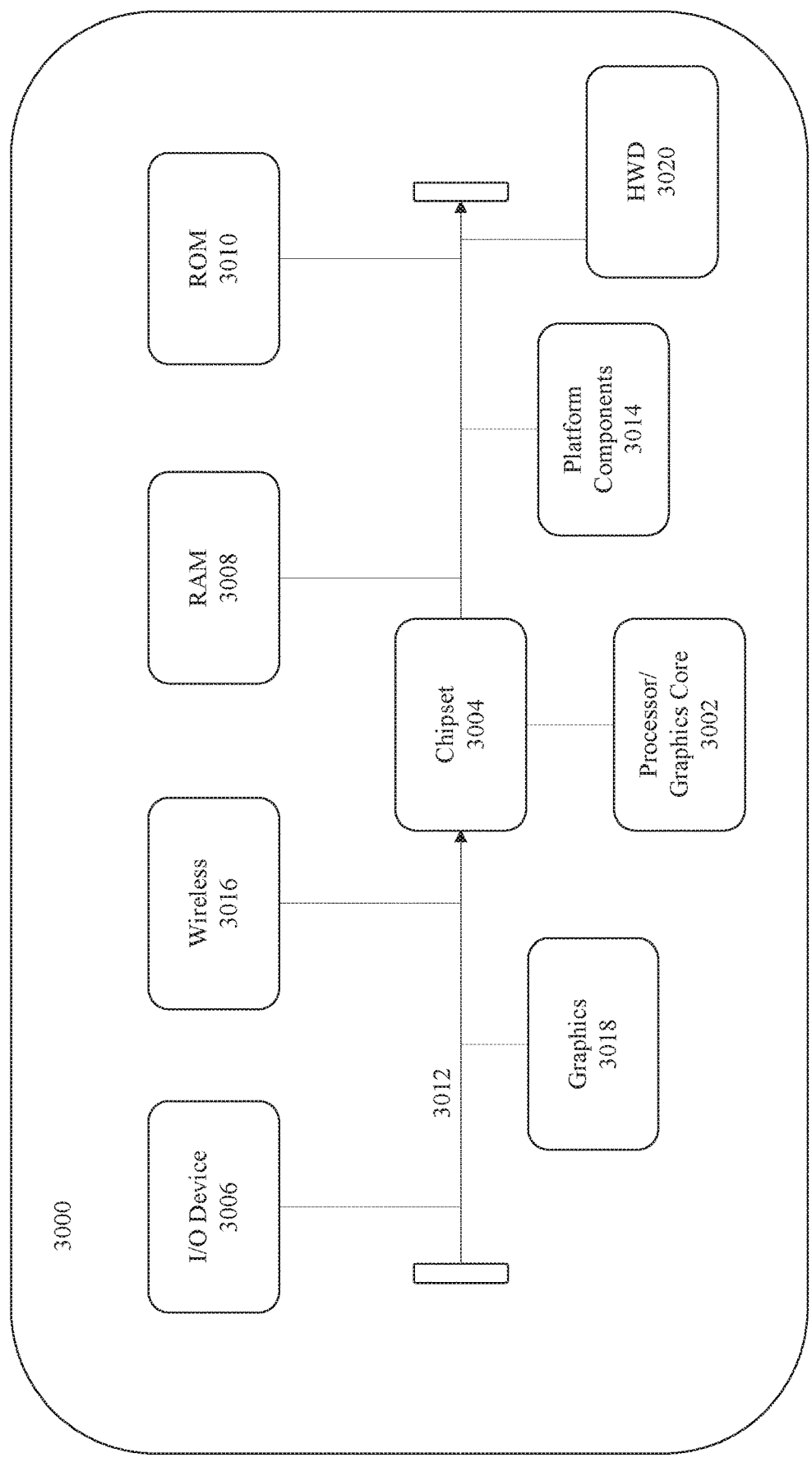
FIG. 10 illustrates an example device comprising a metasurface optical component.

FIG. 10 is a diagram of an exemplary system embodiment and depicts a platform 3000, which may include various elements. For instance, this figure depicts that platform (system) 3000 may include a processor/graphics core 3002, a chipset 3004, an input/output (I/O) device 3006, a random access memory (RAM) (such as dynamic RAM (DRAM)) 3008, and a read only memory (ROM) 3010, optical device 3020 (e.g., optical transceiver 200, demultiplexer 300, VR display 400, VR display 600, or the like), and various other platform components 3014 (e.g., a fan, a cross flow blower, a heat sink, DTM system, cooling system, housing, vents, and so forth). System 3000 may also include wireless communications chip 3016 and graphics device 3018. The embodiments, however, are not limited to these elements.

As depicted, I/O device 3006, RAM 3008, and ROM 3010 are coupled to processor 3002 by way of chipset 3004. Chipset 3004 may be coupled to processor 3002 by a bus 3012. Accordingly, bus 3012 may include multiple lines.

Processor 3002 may be a central processing unit comprising one or more processor cores and may include any number of processors having any number of processor cores. The processor 3002 may include any type of processing unit, such as, for example, CPU, multi-processing unit, a reduced instruction set computer (RISC), a processor that have a pipeline, a complex instruction set computer (CISC), digital signal processor (DSP), and so forth. In some embodiments, processor 3002 may be multiple separate processors located on separate integrated circuit chips. In some embodiments processor 3002 may be a processor having integrated graphics, while in other embodiments processor 3002 may be a graphics core or cores.

Some embodiments may be described using the expression "one embodiment" or "an embodiment" along with their derivatives. These terms mean that a feature, structure, or characteristic described in relation to the embodiment is included in at least one embodiment. The appearances of the phrase "in one embodiment" in various places in the specification are not necessarily all referring to the same embodiment. Further, some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, yet still co-operate or interact with each other. Furthermore, aspects or elements from different embodiments may be combined.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing description, various features are grouped together in a single embodiment to streamline the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

The following examples pertain to further embodiments, from which numerous permutations and configurations will be apparent.

Example 1

An apparatus, comprising: a waveguide arranged to guide light beams from a first end of the waveguide to a second end of the waveguide; and a metasurface lens coupled to the first end of the waveguide, the first metasurface lens arranged to manipulate the light beams to increase an optical coupling between the first end of the waveguide and an optical transmission medium.

Example 2

The apparatus of example 1, the waveguide comprising a reflective surface arranged to reflect the light between the first end and the second end.

Example 3

The apparatus of example 1, comprising a substrate, the waveguide formed on the substrate.

Example 4

The apparatus of example 3, comprising an optical component formed on the substrate, the optical component coupled to the second end of the waveguide.

Example 5

The apparatus of example 4, the optical component a light emitting diode, a laser, or a photodiode.

Example 6

The apparatus of example 1, comprising the optical transmission medium, the optical transmission medium coupled to the first end of the waveguide.

Example 7

The apparatus of example 1, the metasurface lens comprising a plurality of nano-structures, each nano-structure comprising a meta-atom arranged into a geometric structure to manipulate a wavefront associated with the light beam.

Example 8

The apparatus of example 7, the plurality of nano-structures disposed on the first end of the waveguide.

Example 9

A system comprising: an optical component arranged to emit a light beam; an optical transmission medium interface arranged to couple to an optical transmission medium; a waveguide coupled to the optical component and the optical transmission medium interface, the waveguide arranged to transmit the light beam from the optical component to the optical transmission medium; and a metasurface lens disposed between an end of the waveguide and the optical transmission medium interface, the metasurface lens arranged to increase an optical coupling between the waveguide and the optical transmission medium.

Example 10

The system of example 9, the metasurface lens arranged to collimate the light beam.

Example 11

The system of example 9, the waveguide comprising a reflective surface arranged to reflect the light between the first end and the second end.

Example 12

The system of example 9, comprising a substrate, the waveguide formed on the substrate.

Example 13

The system of example 12, the optical component formed on the substrate.

Example 14

The system of example 9, the optical component a light emitting diode, a laser, or a photodiode.

Example 15

The system of example 9, comprising the optical transmission medium.

Example 16

The system of example 15, the optical transmission medium a fiber optic cable.

Example 17

The system of example 9, the metasurface lens comprising a plurality of nano-structures, each nano-structure comprising a meta-atom arranged into a geometric structure to manipulate a wavefront associated with the light beam.

Example 18

The system of example 17, the plurality of nano-structures disposed on the first end of the waveguide.

Example 19

A display to reduce screen door effect, comprising: a plurality of light emitting elements, each of the plurality of light emitting elements arranged to emit a light beam; and a plurality of metasurface lenses, each of the plurality of metasurface lenses arranged to manipulate the light beam emitted by a respective one of the plurality of light emitting elements.

Example 20

The display of example 19, comprising: a transparent dielectric disposed on the plurality of light emitting elements, the plurality of metasurface lenses disposed on the transparent dielectric.

Example 21

The display of example 20, the metasurface lens comprising a plurality of nano-structures, each nano-structure comprising a meta-atom arranged into a geometric structure to manipulate a wavefront associated with the respective one of the plurality of light beams.

Example 22

The display of example 19, the metasurface lenses arranged to diffuse the light beams, steer the light beams, or both diffuse and steer the light beams.

Example 23

The display of example 19, the plurality of light emitting elements comprising light emitting diodes.

Example 24

The display of example 19, wherein a width of each of the plurality of metasurface lenses is wider than a width of each of the plurality of light emitting elements.

Example 25

The display of example 24, wherein adjacent ones of the plurality of metasurface lenses substantially abut each other in a first plane.

Example 26

A method comprising receiving light at a metasurface comprising a number of meta-atoms arranged in a geometric array; and manipulating the light to provide an optical function corresponding to an optical device in which the metasurface is disposed.

Example 27

The method of example 26, the optical device comprising: a waveguide arranged to guide light beams from a first end of the waveguide to a second end of the waveguide, the optical function to increase an optical coupling between the first end of the waveguide and an optical transmission medium.

Example 28

The method of example 26, the waveguide comprising a reflective surface arranged to reflect the light between the first end and the second end.

Example 29

The method of example 26, comprising a substrate, the waveguide formed on the substrate.

Example 30

The method of example 29, comprising an optical component formed on the substrate, the optical component coupled to the second end of the waveguide.

Example 31

The method of example 30, the optical component a light emitting diode, a laser, or a photodiode.

Example 32

The method of example 26, comprising the optical transmission medium, the optical transmission medium coupled to the first end of the waveguide.

Example 33

The method of example 26, the metasurface lens comprising a plurality of nano-structures, each nano-structure comprising a meta-atom arranged into a geometric structure to manipulate a wavefront associated with the light beam.

Example 34

The apparatus of example 33, the plurality of nano-structures disposed on the first end of the waveguide.

Example 35

An apparatus comprising means to perform the method of any one of examples 26 to 33.

What is claimed is:
1. An apparatus, comprising:
 a waveguide arranged to guide light beams from a first end of the waveguide to a second end of the waveguide, the waveguide comprising a reflective surface arranged to reflect the light between the first end and the second end; and
 a metasurface lens coupled to the first end of the waveguide, the first metasurface lens arranged to manipulate the light beams to increase an optical coupling between the first end of the waveguide and an optical transmission medium.
2. The apparatus of claim 1, comprising a substrate, the waveguide formed on the substrate.
3. The apparatus of claim 2, comprising an optical component formed on the substrate, the optical component coupled to the second end of the waveguide.
4. The apparatus of claim 3, the optical component a light emitting diode, a laser, or a photodiode.
5. The apparatus of claim 1, comprising the optical transmission medium, the optical transmission medium coupled to the first end of the waveguide.
6. The apparatus of claim 1, the metasurface lens comprising a plurality of nano-structures, each nano-structure comprising a meta-atom arranged into a geometric structure to manipulate a wavefront associated with the light beam.
7. The apparatus of claim 6, the plurality of nano-structures disposed on the first end of the waveguide.

8. A system comprising:
- an optical component arranged to emit a light beam;
- an optical transmission medium interface arranged to couple to an optical transmission medium;
- a waveguide coupled to the optical component and the optical transmission medium interface, the waveguide arranged to transmit the light beam from the optical component to the optical transmission medium, the waveguide comprising a reflective region arranged to reflect the light between the optical component and the optical transmission medium; and
- a metasurface lens disposed between an end of the waveguide and the optical transmission medium interface, the metasurface lens arranged to increase an optical coupling between the waveguide and the optical transmission medium.

9. The system of claim 8, the metasurface lens arranged to collimate the light beam.

10. The system of claim 8, comprising a substrate, the waveguide formed on the substrate.

11. The system of claim 10, the optical component formed on the substrate.

12. The system of claim 8, the optical component a light emitting diode, a laser, or a photodiode.

13. The system of claim 8, comprising the optical transmission medium.

14. The system of claim 13, the optical transmission medium a fiber optic cable.

15. The system of claim 8, the metasurface lens comprising a plurality of nano-structures, each nano-structure comprising a meta-atom arranged into a geometric structure to manipulate a wavefront associated with the light beam.

16. The system of claim 15, the plurality of nano-structures disposed on the end of the waveguide proximate to the optical transmission medium.

17. A system comprising:
- a fiber optic cable;
- an optical component arranged to emit a light beam;
- a waveguide comprising a first end and a second end, the waveguide to receive the light beam from the optical component at the first end and communicate the light beam to the second; and
- a metasurface lens disposed proximate to the second end of the waveguide, the metasurface lens arranged to increase an optical coupling between the waveguide and the fiber optic cable.

18. The system of claim 17, the metasurface lens arranged to collimate the light beam.

19. The system of claim 17, comprising a substrate, the waveguide formed on the substrate.

20. The system of claim 19, the optical component formed on the substrate.

21. The system of claim 17, the optical component a light emitting diode, a laser, or a photodiode.

22. The system of claim 17, the metasurface lens comprising a plurality of nano-structures, each nano-structure comprising a meta-atom arranged into a geometric structure to manipulate a wavefront associated with the light beam.

23. The system of claim 22, the plurality of nano-structures disposed on the second end of the waveguide.

* * * * *